US008139721B2

(12) United States Patent
O'Connell et al.

(10) Patent No.: US 8,139,721 B2
(45) Date of Patent: Mar. 20, 2012

(54) TELEPHONIC REPEAT METHOD

(75) Inventors: Brian M. O'Connell, Austin, TX (US); Martinianus B. Hadinata, Brunnen (CH); Charles S. Lingafelt, Durham, NC (US); John E. Moore, Brownsburg, IN (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 845 days.

(21) Appl. No.: 12/186,374

(22) Filed: Aug. 5, 2008

(65) Prior Publication Data

US 2010/0034363 A1 Feb. 11, 2010

(51) Int. Cl.
*H04M 1/64* (2006.01)

(52) U.S. Cl. ............ 379/85; 340/996; 369/86; 370/241; 379/68; 379/88.23; 379/201.01; 379/202.01; 379/265.06; 455/411; 455/412.1; 455/413; 455/556.1; 704/201; 704/235; 709/224

(58) Field of Classification Search .................... 369/86; 379/68, 88.22, 88.23, 201.01, 1.02, 85, 202.01, 379/265.06; 455/411, 412.1, 413, 556.1; 704/201, 235; 709/224; 340/996; 370/241
See application file for complete search history.

(56) References Cited

U.S. PATENT DOCUMENTS

| | | | | |
|---|---|---|---|---|
| 5,790,798 A * | 8/1998 | Beckett et al. | ................. | 709/224 |
| 5,898,392 A * | 4/1999 | Bambini et al. | ............... | 340/996 |
| 6,029,063 A * | 2/2000 | Parvulescu et al. | ........ | 455/412.1 |
| 6,058,163 A * | 5/2000 | Pattison et al. | .......... | 379/265.06 |
| 6,668,044 B1 * | 12/2003 | Schwartz et al. | ................ | 379/68 |
| 6,785,369 B2 * | 8/2004 | Diamond et al. | .......... | 379/88.22 |
| 7,065,198 B2 * | 6/2006 | Brown et al. | ............ | 379/202.01 |
| 7,136,630 B2 * | 11/2006 | Xie | ............................. | 455/412.1 |
| 7,227,930 B1 * | 6/2007 | Othmer et al. | ................... | 379/85 |
| 7,333,798 B2 * | 2/2008 | Hodge | .......................... | 455/411 |
| 7,602,892 B2 * | 10/2009 | Cragun | .................... | 379/201.01 |
| 7,664,231 B2 * | 2/2010 | Schmidmer et al. | ......... | 379/1.02 |
| 7,680,056 B2 * | 3/2010 | Keyhl et al. | .................... | 370/241 |
| 7,822,408 B2 * | 10/2010 | Xie | ................................ | 455/413 |
| 2003/0012346 A1 * | 1/2003 | Langhart et al. | ............. | 379/67.1 |
| 2003/0032447 A1 * | 2/2003 | Bulthuis | ....................... | 455/556 |
| 2004/0132432 A1 * | 7/2004 | Moores et al. | ................ | 455/413 |
| 2005/0114116 A1 * | 5/2005 | Fiedler | .......................... | 704/201 |
| 2006/0039263 A1 * | 2/2006 | Trotabas | ......................... | 369/86 |
| 2009/0306981 A1 * | 12/2009 | Cromack et al. | ............. | 704/235 |
| 2010/0034363 A1 * | 2/2010 | O'Connell et al. | ........ | 379/88.23 |

* cited by examiner

*Primary Examiner* — Gerald Gauthier
(74) *Attorney, Agent, or Firm* — Yudell Isidore Ng Russell PLLC

(57) ABSTRACT

A method, system and computer program product for assigning one or more conditions to a telephonic communication system to enable recording, replaying, and pausing of a telephone conversation. Recording of a telephone conversation may be manually or dynamically initiated during the telephone conversation. Dynamic replay of a telephone conversation is automatically initiated when a conversation experiences insufficient call quality, an interruption to the telephone service is detected, the user is distracted, a displacement of the user's phone is detected, or the user toggles between listening modes. A pause mode is automatically entered into during the telephone conversation when a section of the telephone conversation is replayed. An automated pause alert may be played during repeat of the telephone conversation to inform one or more parties that the user is temporarily unavailable. Real-time access to the telephone conversation is resumed when the replaying of the recorded telephone conversation has ended.

20 Claims, 7 Drawing Sheets

TELEPHONIC REPEAT METHOD

BACKGROUND

1. Technical Field

The present invention generally relates to computer implemented telephonic systems and in particular to applications in telephonic computer systems.

2. Description of the Related Art

A common problem with telephone conversations regardless of telephone type (voice over Internet protocol (VoIP), landline, cordless phone, cell phone, etc.), is that there are times when a user cannot hear a section of a telephone conversation. Common examples include when there is temporarily lower call quality, temporary service interruption, ambient noises that prevent a user from hearing a conversation, a user dropping and/or putting down a phone, a user switching between listening modes (e.g. speaker phone, handset, Bluetooth, etc.). Each listening complication may result in a user missing out on part of a conversation. Furthermore, listening complications may result in another party continuing to speak despite the user not being able to hear.

In VoIP systems, current art describes a partial solution to this problem by allowing a VoIP conversation to be recorded, whereby the user may request instant replay of a section of the recorded conversation. The drawback to this method is that application does not notify any other parties of the user's absence while replaying the recording. When the instant replay is concluded, the application allows the user to return to the latest chronological rewind position. Returning to the latest chronological point in the call is a drawback, in many cases, because the user may never catch up to the current point in the conversation. The user's ability to participate in the conversation is hindered, and the other party is confused as to why the user is not responding.

A similar solution to this problem enables a user of a VoIP telephony system to simultaneously engage in multiple conversations by initiating a pause of all conversations, except the one conversation in which the user is listening. The paused conversations are recorded and available for playback when the user returns to the conversation. The obvious drawback to this solution is that the user can never catch up to any conversation after toggling from one conversation to another, nor can the user possibly give expected responses nor actively participate in a current conversation. The only practical use of this technique is therefore to record and listen to simultaneous conversations where the user does not need to participate, such as multiple presented teleconferences where participation is not required.

SUMMARY OF ILLUSTRATIVE EMBODIMENTS

Disclosed are a method, system and computer program product for assigning one or more conditions to a telephonic communication system to enable recording, replaying, and pausing of a telephone conversation. Recording of a telephone conversation may be manually or dynamically initiated during the telephone conversation. Dynamic replay of a telephone conversation is automatically initiated when a conversation experiences insufficient call quality, an interruption to the telephone service is detected, the user is distracted, a displacement of the user's phone is detected, or the user toggles between listening modes. A pause mode is automatically entered into during the telephone conversation when a section of the telephone conversation is replayed. An automated pause alert may be played during repeat of the telephone conversation to inform one or more parties that the user is temporarily unavailable. Real-time access to the telephone conversation is resumed when the replaying of the recorded telephone conversation has ended.

The above as well as additional objectives, features, and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
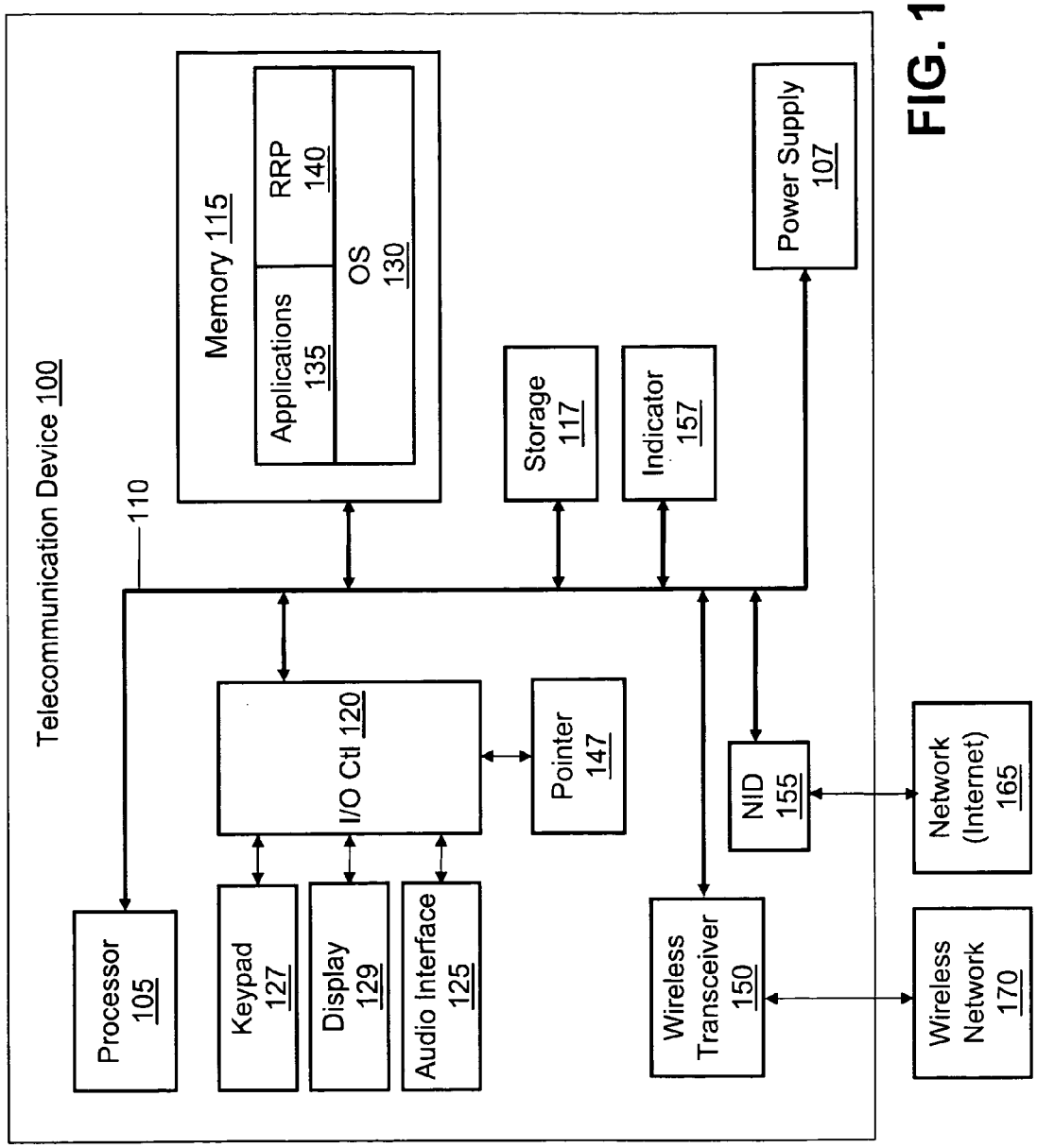
FIG. 1 is a diagram of an example telecommunication device according to one embodiment of the invention.

The illustrative embodiments provide a method, system and computer program product for assigning one or more conditions to a telephonic communication system to enable recording, replaying, and pausing of a telephone conversation. Recording of a telephone conversation may be manually or dynamically initiated during the telephone conversation. Dynamic replay of a telephone conversation is automatically initiated when a conversation experiences insufficient call quality, an interruption to the telephone service is detected, the user is distracted, a displacement of the user's phone is detected, or the user toggles between listening modes. A pause mode is automatically entered into during the telephone conversation when a section of the telephone conversation is replayed. An automated pause alert may be played during repeat of the telephone conversation to inform one or more parties that the user is temporarily unavailable. Real-time access to the telephone conversation is resumed when the replaying of the recorded telephone conversation has ended.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the term "repeat" is interchangeably associated with "replay" in regards to telephonic communication.

With reference now to the figures, FIG. 1 depicts a block diagram representation of a telecommunication device (TCD). TCD 100 comprises at least one processor 105 connected to system memory 115 via system interconnect 110. Processor 105 may include a digital signal processor (DSP) for voice signal processing. Also connected to system interconnect 110 is I/O controller 120, which provides connectivity and control for (a) input devices, of which pointing device 147, and keypad 127 are illustrated, (b) output devices, of which display 129 is illustrated, and (c) audio interface 125, which provides a microphone input and speaker output. Keypad 127 may be a push button numeric dialing pad and/or a fully functional keyboard. Display 129 may be touch-sensitive, also acting as an input device. TCD 100 also comprises storage 117, within which data/instructions/code may be stored. TCD 100 is also illustrated with wireless transceiver 150, with which TCD 100 may accesses external wireless network 170, such as a wireless/cellular network. The call recording component may reside in physical memory on client A TCD 200 and/or physical memory on a server (not shown) controlled by the telephone service provider, a third party, or a similar storage medium.

TCD 100 is also illustrated with network interface device (NID) 155, with which TCD 100 connects to network (Internet) 165. In the described embodiments, network 165 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

TCD 100 also comprises power supply 107, which may be provided as one or more batteries. Power supply 107 may also further include an external power source, such as an AC adapter or a powered docking cradle that supplements or recharges the batteries.

Notably, in addition to the above described hardware components of TCD 100, various features of the invention are completed via software (or firmware) code or logic stored within memory 115 or other storage (e.g., storage 117) and executed by processor 105. Thus, illustrated within memory 115 are a number of software/firmware components, including operating system (OS) 130 (e.g., Microsoft Windows®, a trademark of Microsoft Corp, or GNU®/Linux®, registered trademarks of the Free Software Foundation and The Linux Mark Institute), applications 135, and record, repeat, pause (RRP) utility 140. The call record component of TCD 100, controlled by RRP utility 140, allows a recording/playback system to record/playback audio/video data which includes video information, audio information, and control information on/from a predetermined information storage medium (storage 117). For simplicity, RRP utility 140 is illustrated and described as a stand alone or separate software/firmware component, which provides specific functions, as described below.

Processor 105 executes RRP utility 140 as well as OS 130, which supports the user interface features of RRP utility 140. In the illustrative embodiment, RRP utility 140 provides a graphical user interfaces (GUI) to enable user interaction with, or manipulation of, the functional features of the utility (140). Among the software code/instructions provided by RRP utility 140, and which are specific to the invention, are: (a) code for assigning one or more conditions to a telephonic communication system to enable recording; repeating; and pausing of a telephone conversation; (b) code for enabling automatic or dynamic recording during the telephone conversation; and (c) code for initiating record, replay, or pause of the telephone conversation when one or more conditions are detected. For simplicity of the description, the collective body of code that enables these various features is referred to herein as RRP utility 140. According to the illustrative embodiment, when processor 105 executes RRP utility 140, TCD 100 initiates a series of functional processes that enable the above functional features as well as additional features/functionality, which are described below within the description of FIGS. 2-7.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The telecommunication device depicted in FIG. 1 may be, for example, a Blackberry™, Palm Treo™, iPhone™, and other devices capable of providing/executing outgoing and incoming calls. However, the device in which the application is utilized may not necessarily be a mobile device. The functionality described herein may be extended to other non-mobile communication devices, such as public switch telephone network (PSTN) phones (analog/digital) and voice over Internet protocol (VOIP) phones and the like.

Figure 2:
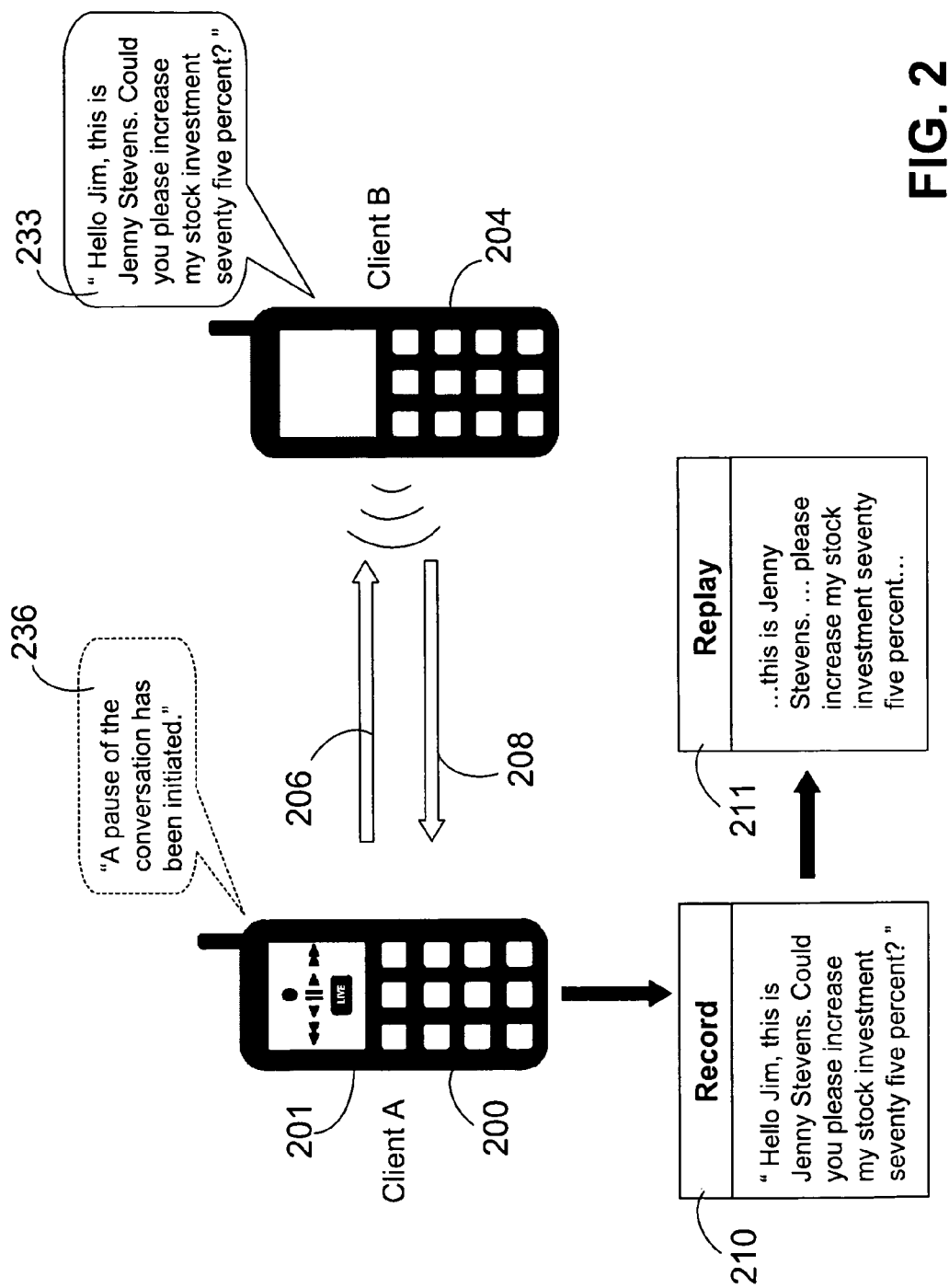
FIG. 2 is a diagram of telecommunication devices in accordance with one embodiment of the invention.

With reference now to FIG. 2, wherein is depicted communication between two mobile communication devices. FIG. 2 comprises client A TCD 200 and client B TCD 204. Client A TCD 200 and client B TCD 204 engage in mutual conversation, as illustrated by outgoing arrow 206 and incoming arrow 208. Client A TCD 200, (similar to TCD 100 of FIG. 1), is configured with graphical user interface (GUI) 201. Functions of GUI 201 may exist on the keypad of Client A TCD 200 (similar to keypad 127). Statement 233 provided by client B TCD 204 is recorded by client A TCD 200, as illustrated with recorded statement 210. Record 210 depicts the recording of statement 233. Record 210 stores the recorded statement(s) and may be briefly replayed with replay 211. When replay 211 is initiated, automated pause signal 236 may be sent to client B TCD 204. An automated pause signal may be sent to client B TCD 204 when replay 211 ends.

In one embodiment, the call recording component, or recording sequence, is responsible for recording one or more sections of a conversation. The call recording component on client A TCD 200 may record and store an entire conversation. Statement 233 is stored by record 210. Replay 211 allows client A TCD 200 to slowly and/or briefly listen to a replay of the recorded statement. During the replay of statement 233, automated pause statement 236 may be initiated by the telephonic system and/or the service provider.

In one embodiment, the call recording component is responsible for recording one or more sections of a conversation. The call recording component on client A TCD 200 may record and store an entire conversation. Statement 233 is stored by record 210. Replay 211 allows client A TCD 200 to slowly and/or briefly listen to a replay of the recorded statement. During the replay of statement 233, automated pause statement 236 may be played by the telephonic system and/or the service provider.

In one embodiment, the invention enables users of a telephonic system to replay an unheard section of a conversation. A request to replay a total or partial conversation is made by client A TCD 200. RRP utility 140 (FIG. 1) allows conditions to be specified wherein, when the conditions are detected, trigger recording of the most recent time 'x' period, wherein time 'x' is a finite time period defined by the user, service provider, and/or storage restrictions of client A TCD 200 (e.g. recording only the most recent 120 seconds of a call in storage).

The call recording component enables the most recent seconds, from a static point (i.e. the time when insufficient call quality, call service interruption is experienced) in time, to be recorded. In one embodiment, record 210 is dynamically initiated by RRP utility 140 (FIG. 1) when call quality is detected to be insufficient and/or call service is interrupted. Client A TCD 200 may input a condition which allows recording to begin at a time relative to the insufficient call quality and/or call service. For example, call quality conditions, as specified by one or more call quality metrics, may be associated with instructions. The call quality instructions may initiate recording immediately, in response to detecting insufficient call quality. Call quality instructions may further specify a time period 'x', after (or before) detecting insufficient call quality, for which to perform the recording.

In another embodiment, GUI 201 is provided to enable the user of client A TCD 200 to control when and/or how much to store when record 210 is initiated. In addition to GUI 201, dedicated selections within keypad 127 (FIG. 1), key sequences, and/or voice commands, web interface, phone settings, and/or pointing device entries enable the selection of one or more preferences and may be utilized to establish control of the call recording component.

In one embodiment, replay 211 invokes a replay sequence which dynamically repeats the telephone conversation when one or more of the following is detected: insufficient call quality, interruption to the telephone service, distraction of the user, displacement of the user's phone, and toggling between telephone listening modes (e.g. handset, speakerphone, Bluetooth, earpiece). Toggling between listening modes includes, but is not limited to, detecting the failure of a listening mode caused by battery loss, mechanical failure, etc. Conditions are input via a service provider and/or user of client A TCD 200 to enable RRP utility 140 to replay time 'x' of a conversation when one or more conditions are met. RRP utility 140 detects the one or more conditions, dynamically initiates replay 211, and automatically sends automated pause statement 236 to client B TCD 204. When replay 211 has completed replay of the statement, or the user manually ends replay of the statement, the RRP utility may return the user to the live (real-time) conversation, and a similar automated pause statement 236 may be automatically sent to announce the user has returned to the call.

In another embodiment, replay 211 is dynamically enabled when a user is distracted. There are multiple ways to establish when a user is distracted. One such technique may be through use of an apparatus such as one or more of the following: a pressure sensor on the receiver of client A TCD 200, an infrared sensor on the receiver of client A TCD 200 to detect heat from the user, or a range finder such as a laser or echolocation from the receiver of client A TCD 200. Echolocation is the use of ultra-high frequency sounds for navigation. A laser or echolocation detects if a user's ear is close to the phone. The apparatus may serve the invention as a detection mechanism only when the phone is not in speakerphone mode. An example of the use one such apparatus is in the Apple iPhone, which detects when the user brings the phone near the user, and when the phone is moved away. This functionality is utilized to disable the touch screen to prevent accidental invocation of commands and conserves battery power by not powering the screen.

In one embodiment, other techniques for detecting user distraction include use of a camera attached to client A TCD 200, issuing a periodic query, and/or detection of another active device (e.g. a computer keyboard, second phone). The camera may provide pattern analysis to detect if the user's head or body is sufficiently far away from client A TCD 200, such as if the user has left the room where client A TCD 200 is located. The camera detection device may be utilized in speakerphone mode. A periodic query to the user requiring some action to signify active listening may also be utilized. In a periodic query, client A TCD 200 issues a beep or vibrate, at which point the user must press a button or otherwise indicate active listening. Distraction may also be detected when a user has initiated interaction with one or more second devices.

In one embodiment, the call pause sequence is invoked, sending automated pause statement 236. When replay 211 is invoked manually or dynamically, the call enters into a pause mode. Client B 204 (and any other party partaking in the conversation) is notified via automated pause statement 236. Automated pause statement 236 may include a prediction of how long the call may be paused and/or a means to predict when a service interruption may be rectified. The prediction may be based on predefined settings, a user's declaration in an interface, and/or based on past history. Similarly, if the user or condition has requested time 'x' to be replayed, the announcement may include how many seconds are to be repeated. The user may also be provided the opportunity to allow a conversation to continue while in replay mode. Automated pause statement 236 may be suppressed by the user manually or by the user establishing a preference. An example of an established preference is to automatically suppress the automated pause statement 236 if there are more than ten parties on a teleconference, and where the user did not join the teleconference using a moderator pass code.

In one embodiment, conditions invoked during a telephone conversation trigger recording, replaying, and pausing of the telephone conversation. When one or more conditions are met, wherein the conditions are assigned to a telephonic communication system, recording, replaying, and pausing of the telephone conversation may be triggered. The one or more conditions are associated with a corresponding record, replay, and pause sequence.

Figure 3:
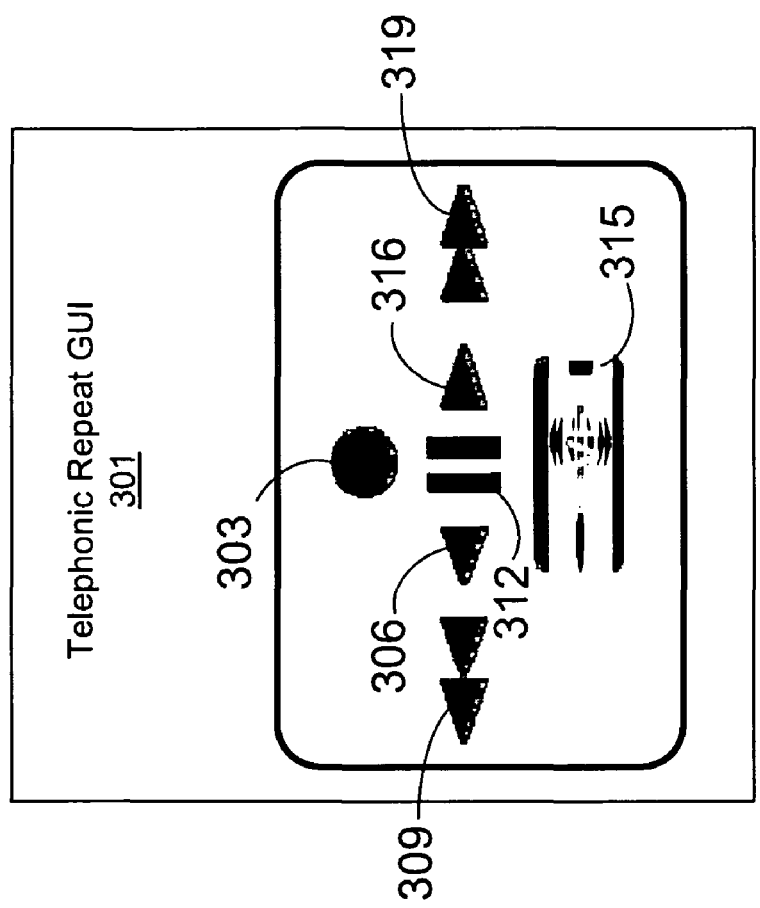
FIG. 3 is a graphical user interface to enable control of record, replay, and pause functions when using a telecom device according to one embodiment of the invention.

FIG. 3 illustrates telephonic replay GUI 301. Telephonic replay GUI 301 comprises selection buttons including: record 303, pause 312, rewind 306, fast rewind 309, forward 316, fast forward 319, and live selection 315. Telephonic GUI 301 may be opened to enable manual selection of the record component, replay component, and the other selectable components within GUI 301.

When record 303 is selected, the recording is optimized prior to replay, to reduce the time that the user will be in replay mode. Optimization may include, but is not limited to, one or more of the following described techniques. Sound pattern analysis of recorded sections that indicates silence may be stripped and/or reduced from the recording (including pauses between words and sentences). Sound pattern analysis of laughter or any other persistent frequency (such as a user holding down a key issuing a constant tone) may be stripped and/or reduced. Sound pattern analysis of detectable superfluous audio, such as on-hold music, and spoken "uhs" or "ums" may be stripped out and/or reduced. The rate of recording may be sped up (e.g. 1.3 times normal time). The above described techniques may be implemented when record is utilized manually and/or dynamically.

During playback, or replay, the user may optionally rewind, forward, or skip to another point in time during the replay. An interface may be displayed that provides the functions of rewind 306, fast rewind 309, forward 316, or fast forward 319, wherein the functions allow manipulation of the recorded statement(s). Rewind 306, fast rewind 309, forward 316, or fast forward 319 may be provided in a GUI (e.g. telephonic GUI 301), as a coded function of a designated key in a keypad/keyboard, a combination of keys within a keypad/keyboard, and/or received as a voice command. The playback may also be replayed in an increased or decreased speed. Replaying the recorded information in an increased or decreased speed may be implemented via key selections within telephonic GUI 301, or a preset combination of other keys within and or associated with TCD 100 (FIG. 1).

GUI 301 provides pause selection 312, wherein pause selection 312 is a selected when the user needs to manually pause the conversation. Enabling pause selection 312 may initiate sending a message to one or more listening parties. To return to the real-time conversation, live button 315 may be selected. One or more other key combinations may be utilized to return to a live conversation, such as enabling pause selection 312 multiple times as well as designating a key or combination of keys to initiate a pause and a return to "live" condition during a conversation. In one implementation, voice commands may be utilized to invoke any command illustrated in GUI 301.

FIGS. 4-7 are flow charts illustrating various methods by which the above processes of the illustrative embodiments are completed. Although the methods illustrated in FIGS. 4-7 may be described with reference to components shown in FIGS. 1-3, it should be understood that this is merely for convenience and alternative components and/or configurations thereof can be employed when implementing the various methods. Key portions of the methods may be completed by RRP utility 140 executing within TCD 100 (FIG. 1) and controlling specific operations on TCD 100, and the methods are thus described from the perspective of both RRP utility 140 and TCD 100.

Figure 4:
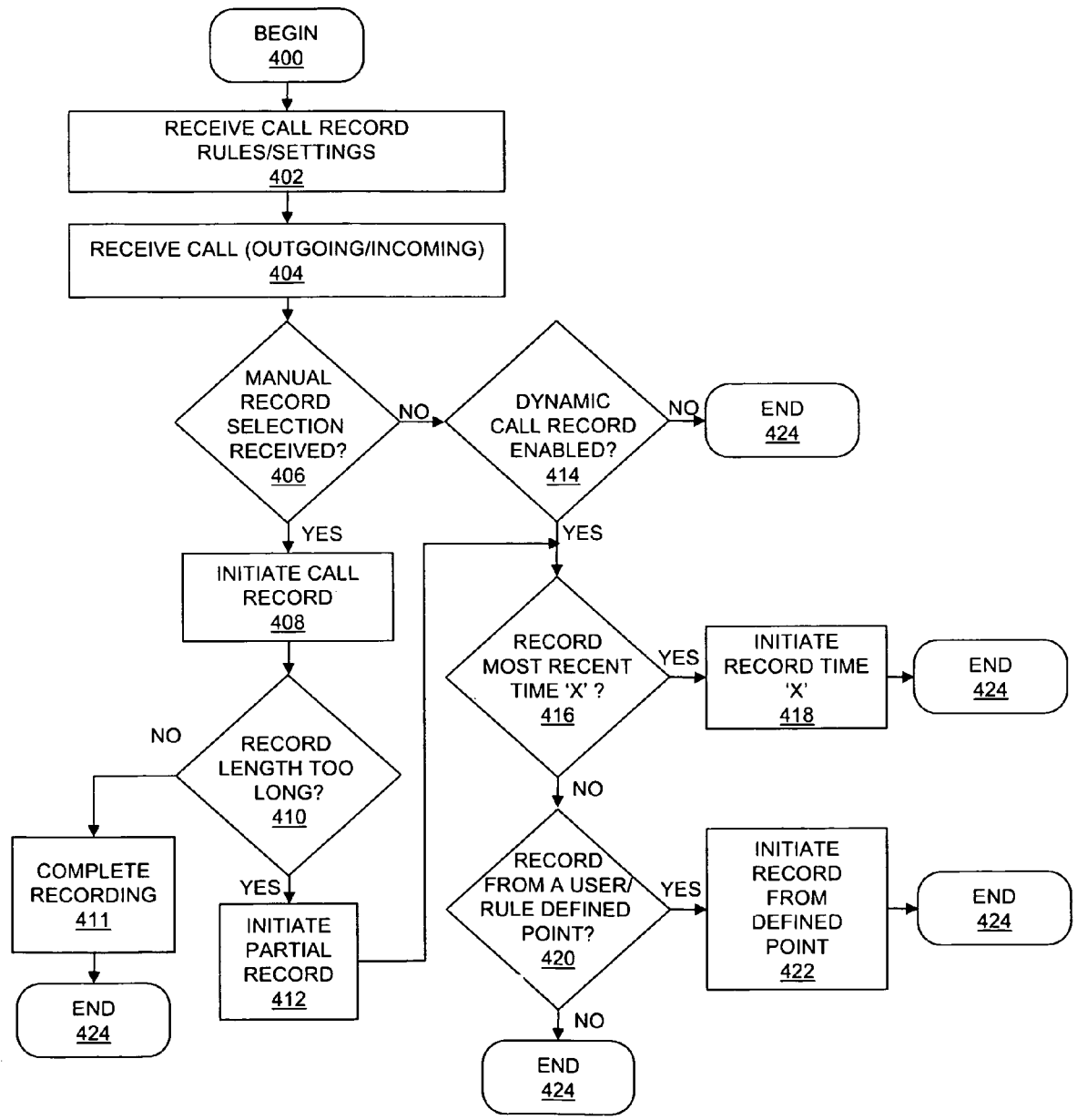
FIG. 4 is a logic flow chart illustrating the method for implementing the call recording component, in accordance with one embodiment of the invention.

FIG. 4 is a logic flow chart illustrating the method of implementing the call recording component of the described embodiments. The process of FIG. 4 begins at initiator block 400 and proceeds to block 402, at which call record conditions/settings are received. At block 404 a call is received (outgoing or incoming). A decision is made, at block 406, whether a manual call record selection is received. If a manual call record selection is received, the process continues to block 408. If a manual call record selection is not received, the process continues to block 414. When the manual call record is received call record is initiated, block 408. At block 410, a decision is made whether the record length is too long. If the record length is too long, the process continues to block 412. If the record length is not too long the process continues to block 411, at which the recording is completed. The process ends at block 424. Partial record is initiated at block 412, wherein partial record records the most recent 'x' seconds ('x' seconds is a predefined maximum record length). The process continues to block 416.

When the manual record selection is not received a decision is made, at block 414, whether dynamic call record is enabled. If dynamic call record is not enabled, the process ends at block 424. If dynamic call record is enabled, the process continues to block 416. At block 416 a decision is made whether to record the most recent time 'x', wherein 'x' is a finite time defined in the record conditions/settings. If a decision is made to record the most recent time 'x', the process continues to block 418. If a decision is made not to record the most recent time 'x', the process continues to block 420. When a decision is made to record most recent time 'x', the most recent time 'x' is recorded at block 418. After the most recent time 'x' is recorded, the process ends at block 424.

When the most recent time 'x' is not recorded, a decision is made at block 420 whether to record from a user/condition defined point (i.e. when call quality is detected to be insufficient or call service is interrupted). If a decision is made to record from a user defined point, wherein the defined point is a predetermined point of time or when a keyword is spoken, the process continues to block 422. If a decision is made not to record from a user defined point, the process ends at block 424. When the decision is made to record from a user/condition defined point, at block 422 record is initiated from the user defined point. The process ends at block 424. The process of FIG. 4 may be invoked multiple times within the same call, until the call has ended. The conditions/settings of block 402 may be received prior to a call being received or while a client is engaged in a phone call.

Figure 5:
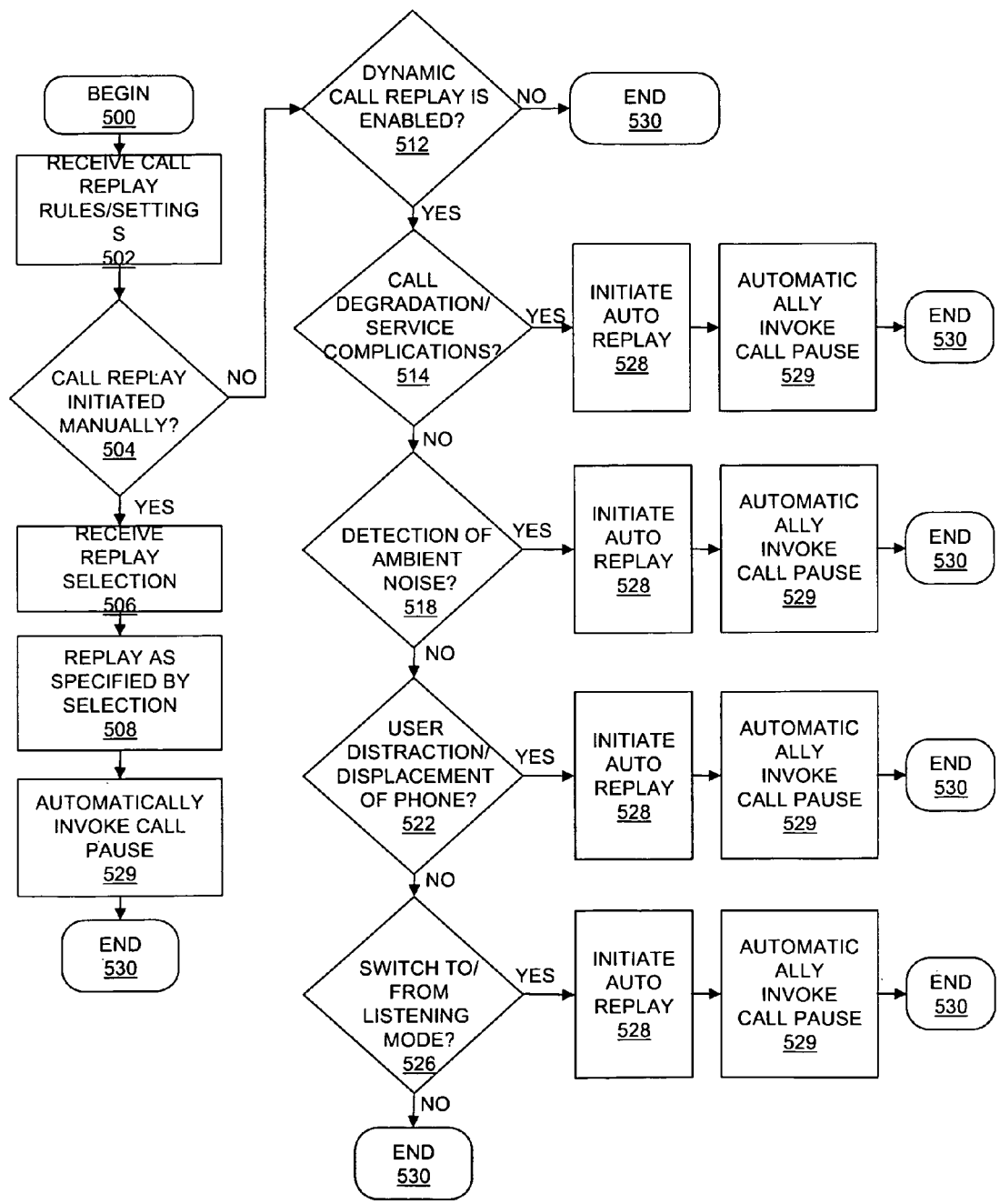
FIG. 5 is a logic flow chart illustrating the process for initiating the repeat component, according to one embodiment of the invention.

The process for initiating the replay component of the described embodiments is illustrated in FIG. 5. The process of FIG. 5 begins at initiator block 500 and proceeds to block 502, at which the call replay conditions/settings are received. A decision is made, at block 504, whether call replay is initiated manually. If call replay is initiated manually, the process continues to block 506. If call replay is not initiated manually, the process continues to block 512. When call replay is initiated manually, the manual selection to replay is received at block 506. At block 508 the call is replayed as specified by the selection, wherein the selection may be rewind, fast rewind, fast replay, slow replay, forward, and fast forward. When a call selection is invoked at block 508, the call is automatically paused at block 529. The process ends at block 530.

When call replay is not initiated manually a decision is made, at block 512, whether dynamic call replay is enabled. If dynamic call replay is enabled, the process continues to block 514. If dynamic call replay is not enabled, the process ends at block 530. When dynamic call replay is enabled a decision is made whether call degradation and/or service complications are detected, at block 514. The process continues to block 528 if call degradation and/or service complications are detected. If call degradation and/or service complications are not detected, the process continues to block 518. At block 528, when call degradation and/or service complications are detected, auto replay is initiated. Call pause is automatically invoked at block 529. The process ends at block 530. When call degradation and/or service complications are not detected a decision is made, at block 518, whether ambient noise is detected. If ambient noise is not detected the process continues to block 522. If ambient noise is detected, the process continues to block 528, at which auto replay is initiated. When auto replay is initiated, call pause is automatically invoked at block 529. The process ends at block 530.

When ambient noise is not detected a decision is made, at block 522, whether user distraction and/or displacement of the phone are detected. If user distraction and/or displacement of the phone are detected, the process continues to block 528. One or more devices may be enabled to detect movement, distance, and active listening. When the movement and the distance are detected, call record is automatically initiated. Also, when active listening is no longer detected, the call record is automatically initiated. The process continues to block 526 if user distraction and/or displacement of the phone are not detected.

When user distraction and/or displacement of the phone are not detected a decision is made, at block 526, whether a switch to and/or from a listening mode (i.e. handset, Bluetooth, speaker phone, earpiece, etc) is detected. If a switch to and/or from a listening mode is detected, the process continues to block 528. If a switch to and/or from a listening mode is not detected the process ends at block 530, at which auto replay is initiated. When auto replay is initiated, the process ends at block 530. The process steps of FIG. 5 may occur multiple times until the call has ended. The conditions/settings of block 502 may be received prior to a call being received or while a client is engaged in a phone call.

Figure 6:
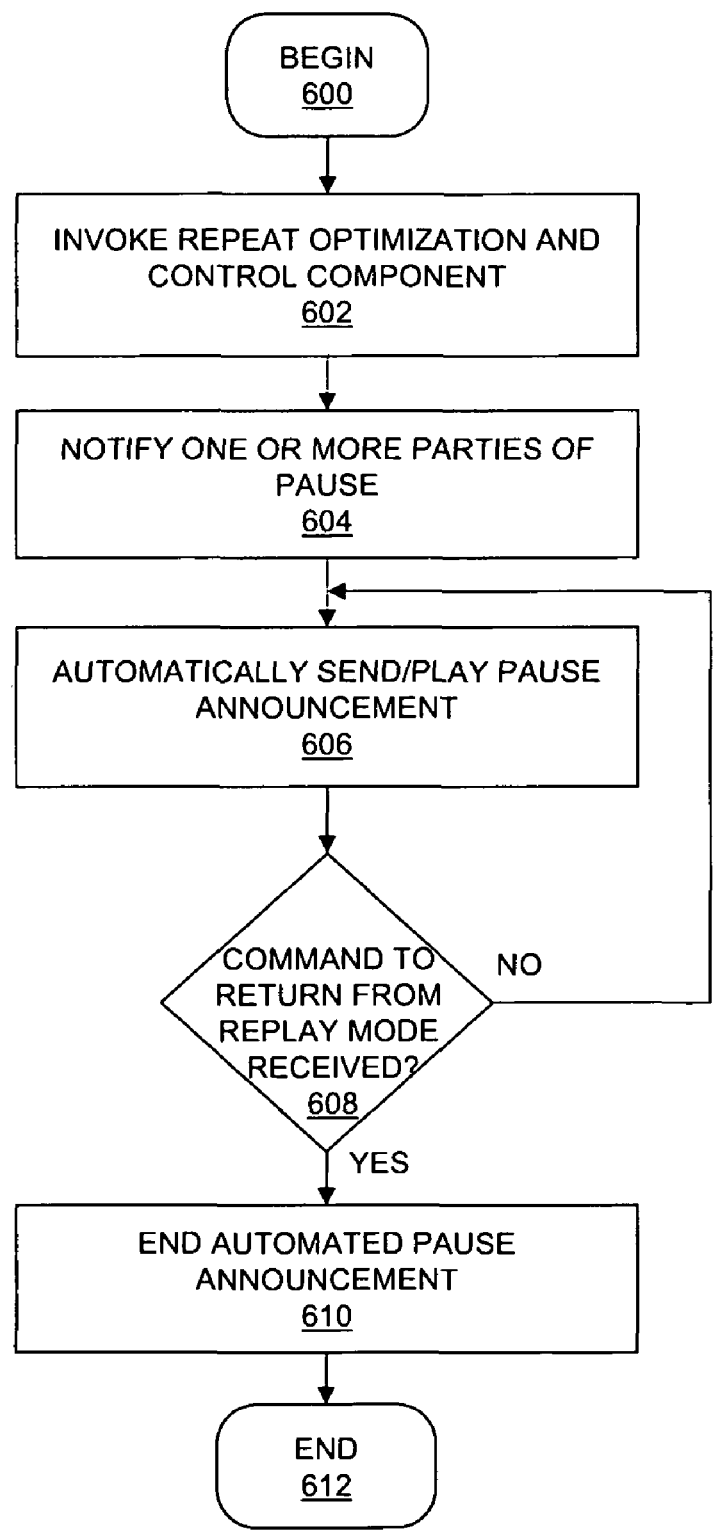
FIG. 6 is a logic flow chart illustrating the method for invoking the pause component in accordance with one embodiment of the invention.

FIG. 6 depicts the method for invoking the pause component. The process of FIG. 6 begins at initiator block 600 and proceeds to block 602, at which the replay optimization and control component is invoked. The RRP utility 140 automatically detects when to initiate pause, and one or more parties are notified of the temporary pause at block 604. At block 606, an automated pause announcement is made to one or more parties. A decision is made, at block 608, whether a command to return from replay mode is received. If the command to return from replay mode is received, the process continues to block 610. The process returns to block 606 if the command to return from replay mode is not received. When the command to return from replay mode is received, playing of the automated pause announcement is concluded at block 610. The process ends at block 612.

Figure 7:
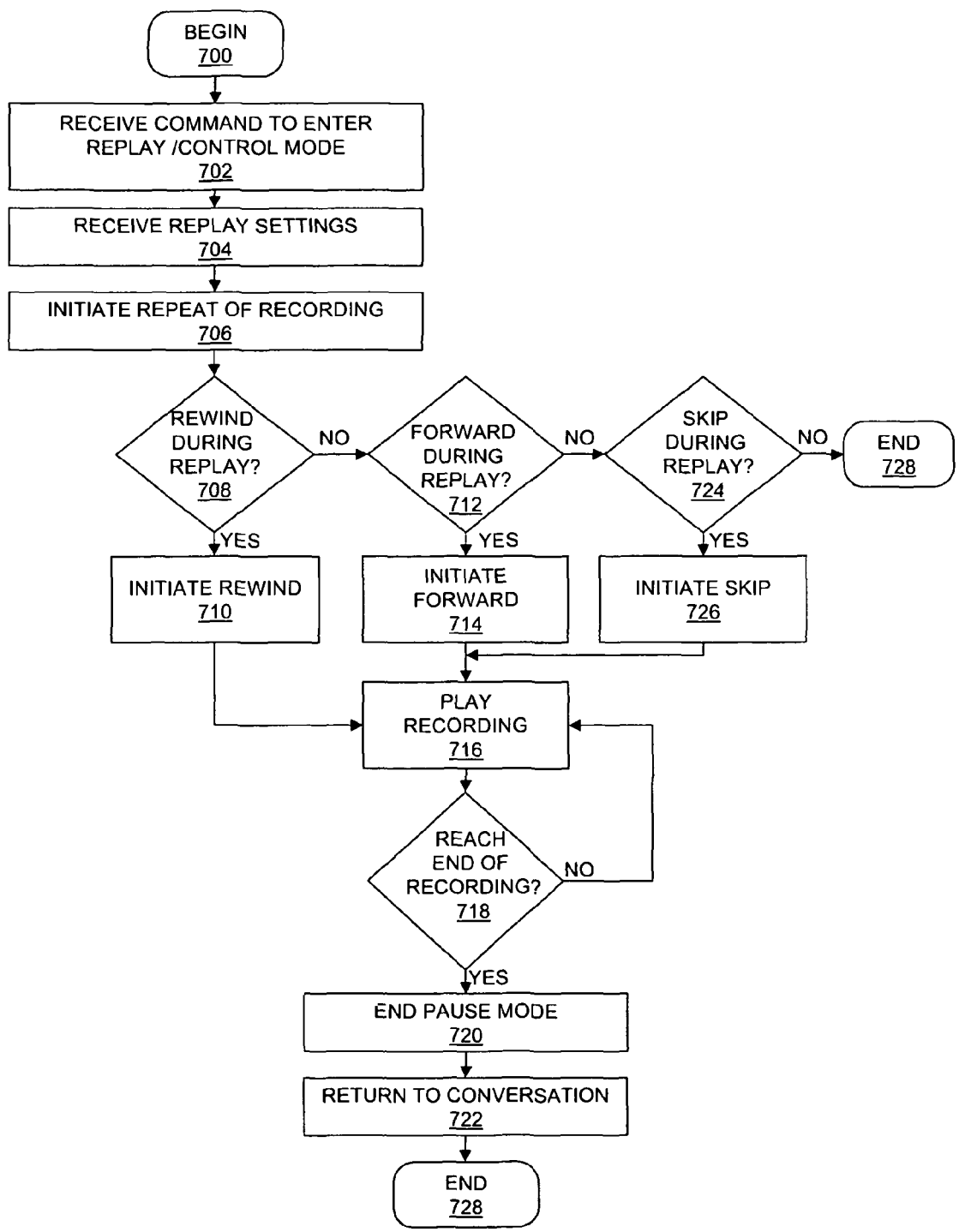
FIG. 7 is a logic flow chart illustrating the method for manually controlling the repeat component according to one embodiment of the invention.

The method for manually controlling the replay (or repeat) component is illustrated in FIG. 7. The process of FIG. 7 begins at initiator block 700 and proceeds to block 702, at which a command is received to enter replay/control mode. At block 704 the replay settings are received. The replay of the recording is initiated at block 706. At block 708 a decision is made whether a request to rewind the recording is received. If a request to rewind is not detected, the process continues to block 712. If a request to rewind is detected, the process continues to block 710. When the request to rewind is received, at block 710, a rewind of the recording is initiated. The process continues to block 716. When a request to rewind is not received a decision is made, at block 712, whether an input to initiate forward during replay of the recording is received. If the forward selection is initiated, the process continues to block 714 and the forward command is initiated. When the forward selection is not initiated, the process continues to block 724. The process continues to block 716 when forward is initiated. When the forward selection is not received, at block 724, a decision is made whether a command is received to skip a predefined amount of time during the recording. The process continues to block 726, if a command to skip a predefined amount of time is received. If a decision is made not to skip the predefined amount of time during the recording, the process ends at block 728. The skip command is initiated at block 726. The process continues to block 716 when skip is initiated.

At block 716 the recording is played. A decision is made at block 718 whether the end of the recording is reached. If the end of the recording is reached, the process continues to block 720. If the end of the recording has not been reached, the process returns to block 716. When the end of the recording is reached, the process continues to block 720. The pause mode ends at block 720. At block 722, the user returns to the live (real-time) conversation. The process ends at block 728.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for selectively recording, replaying, and pausing a portion of a telephone conversation, said method comprising:
   assigning, by a processor, one or more conditions to a telephonic communication system to trigger recording, replaying, and pausing of the telephone conversation, wherein assigning associates the one or more conditions to a corresponding record, replay, and pause sequence; and
   initiating, by the processor, the record, replay, and pause sequence in response to detecting one or more of said assigned conditions;
   wherein the record, replay, and pause sequence comprises dynamically replaying the telephone conversation in an optimized mode.

2. The method of claim 1, further comprising:
   automatically detecting the assigned conditions, wherein said assigned conditions are one or more of:
   insufficient call quality;
   interruption to the telephone service;
   displacement of the telephone; and
   toggling between telephone listening modes.

3. The method of claim 1, wherein initiating the record, replay, and pause sequence further comprises:
   recording the telephone conversation in response to detection of one or more of the assigned conditions;
   transmitting a prompt to replay the telephone conversation when one or more of the assigned conditions are detected; and
   initiating a pause mode during replay of the telephone conversation.

4. The method of claim 3, further comprising:
   sending an automated pause alert to one or more parties associated with the telephone conversation; and
   accessing the telephone conversation in real-time when replay of the recorded telephone conversation is complete.

5. The method of claim 1, wherein the optimized mode is generated by conducting a sound pattern analysis of the recorded telephone conversation that reduces at least one of:
   silence, laughter, constant key tones, and superfluous audio.

6. The method of claim 1, further comprising:
   initiating a call record in response to a manual record selection; and
   discontinuing the call record when a stop command is received.

7. The method of claim 2, further comprising:
   dynamically initiating a call record when a static point is encountered wherein the static point is one or more of: insufficient call quality and call service interruption;
   initiating a partial call record when a record length exceeds a provided memory capacity;
   enabling the partial call record wherein the partial call record records one or more of:
   a call from a most recent time 'x', when 'x' is a defined amount of time;
   the call from a static point in time, wherein the static point is received when one or more conditions are defined; and
   the call from a defined point, wherein the defined point is a predefined point of time or when a keyword is spoken.

8. The method of claim 3, further comprising:
   enabling a manual replay selection, wherein replay repeats one or more recorded selections;
   in response to receiving the manual replay selection, replaying the one or more recorded selections;
   receiving one or more conditions that automatically invoke replay of the telephone conversation, wherein the conditions include one or more of:
   the telephone conversation experiences call degradation;
   the telephone service experiences complications;
   a distraction is detected;
   a displacement of a telephone is detected;
   battery loss is detected;
   mechanical failure of one or more phones is detected;
   ambient noise is detected; and
   a telephone switches to or from a listening mode.

9. The method of claim 3, further comprising sending an automated pause alert by:
   automatically detecting when to initiate pause;
   enabling pause when a command to replay is received; and
   automatically transmitting an automated announcement when manual or automatic replay is invoked.

10. The method of claim 2, further comprising automatically recording the telephone conversation by:
    associating the telephonic communication system with a pattern analysis system;
    automatically recording the telephone conversation when the pattern analysis system detects the telephonic communication system is displaced;
    in response to receiving a telephone conversation, automatically transmitting a periodic signal;
    in response to one or more buttons being engaged, limiting the volume of the periodic signal for a predetermined time; and
    automatically recording the telephone conversation in response to one or more buttons not being engaged.

11. A system comprising:
    a communication device;
    a processor;
    a utility executable by:
    assigns one or more conditions to a telephonic communication system to trigger recording, replaying, and pausing of the telephone conversation, wherein assigning associates the one or more conditions to a corresponding record, replay, and pause sequence; and
    initiates the record, replay, and pause sequence in response to detecting one or more of said assigned conditions;
    wherein the record, replay, and pause sequence comprises dynamically replaying the telephone conversation in an optimized mode.

12. The system of claim 11, wherein the utility further:
    automatically detects the assigned conditions, wherein said assigned conditions are one or more of:
    insufficient call quality;
    interruption to a telephone service;
    distraction of the user;
    displacement of the telephone; and
    toggling between telephone listening modes.

13. The system of claim 11, wherein the utility further initiates the record, replay, and pause sequence by:
- recording the telephone conversation in response to detection of one or more of the assigned conditions;
- transmitting a prompt to replay the telephone conversation when one or more of the assigned conditions are detected; and
- initiating a pause mode during replay of the telephone conversation.

14. The system of claim 11, wherein the optimized mode is generated by:
- conducting a sound pattern analysis of the recorded telephone conversation that reduces: silence, laughter, constant key tones, and superfluous audio;
- initiating a call record in response to a manual record selection;
- in response to receiving a stop command, discontinuing the call record;
- sending an automated pause alert to one or more parties associated with the telephone conversation; and
- accessing the telephone conversation in real-time when replay of the recorded telephone conversation is complete.

15. The system of claim 12, wherein the utility further:
- in response to encountering a static point, dynamically initiates a call record, wherein the static point is one or more of: insufficient call quality and call service interruption;
- in response to a record length exceeding a provided memory capacity, initiates a partial call record;
- enables the partial call record wherein the partial call record records one or more of:
  - a call from a most recent time 'x', when 'x' is a defined amount of time;
  - the call from a static point in time, wherein the static point is received when one or more conditions are defined; and
  - the call from a defined point, wherein the defined point is a predefined point of time or when a keyword is spoken.

16. The system of claim 13, wherein the utility:
- enables a manual replay selection, wherein replay repeats one or more recorded selections;
- in response to receiving the manual replay selection, replays the one or more recorded selections;
- receives one or more conditions that automatically invoke replay of the telephone conversation, wherein the conditions include one or more of:
  - the telephone conversation experiences call degradation;
  - the telephone service experiences complications;
  - a distraction is detected;
  - a displacement of a telephone is detected;
  - battery loss is detected;
  - mechanical failure of one or more phones is detected;
  - ambient noise is detected; and
  - a telephone switches to or from a listening mode;
- automatically detects when to initiate pause;
- enables pause when a command to replay is received; and
- automatically transmits an automated announcement when manual or automatic replay is invoked.

17. The system of claim 12, wherein the utility automatically records the telephone conversation by:
- associating the telephonic communication system with a pattern analysis system;
- in response to the pattern analysis system detecting that the telephonic communication system is displaced, automatically recording the telephone conversation;
- in response to receiving a telephone conversation, automatically transmitting a periodic signal;
- in response to one or more buttons being engaged, limiting the volume of the periodic signal for a predetermined time; and
- in response to the one or more buttons not being engaged, automatically recording the telephone conversation.

18. A computer program product comprising:
- a tangible computer readable storage medium; and
- program code on the computer readable storage medium that when executed by a processor provides the functions of:
  - assigning one or more conditions to a telephonic communication system to trigger recording, replaying, and pausing of the telephone conversation, wherein assigning associates the one or more conditions to a corresponding record, replay, and pause sequence;
  - initiating the record, replay, and pause sequence in response to detecting one or more of said assigned conditions;
  - recording the telephone conversation in response to detection of one or more of the assigned conditions;
  - transmitting a prompt to replay the telephone conversation when one or more of the assigned conditions are detected;
  - initiating a pause mode during replay of the telephone conversation;
  - automatically detecting the assigned conditions, wherein said assigned conditions are one or more of:
    - insufficient call quality;
    - interruption to the telephone service;
    - distraction of the user;
    - displacement of the telephone; and
    - toggling between telephone listening modes;
  - associating the telephonic communication system with a pattern analysis system;
  - automatically recording the telephone conversation when the pattern analysis system detects the telephonic communication system is displaced;
  - when a telephone conversation is received, automatically transmitting a periodic signal;
  - when one or more buttons are engaged, limiting the volume of the periodic signal for a predetermined time; and
  - automatically recording the telephone conversation when one or more buttons are not engaged.

19. The computer program product of claim 18, further comprising program code for:
- automatically recording the telephone conversation when one or more of the assigned conditions are detected:
- dynamically initiating the call record when a static point is encountered wherein the static point is one or more of: insufficient call quality and call service interruption;
- in response to a record length exceeding provided memory capacity, initiating a partial call record; and
- enabling the partial call record wherein the partial call record records one or more of:
  - a call from a most recent time 'x', when 'x' is a defined amount of time;
  - the call from a static point in time, wherein the static point is received when one or more conditions are defined; and
  - the call from a defined point, wherein the defined point is a predefined point of time or when a keyword is spoken.

20. The computer program product of claim 18, further comprising program code for:

dynamically replaying the telephone conversation in an optimized mode, wherein the optimized mode includes conducting a sound pattern analysis of the recorded telephone conversation that reduces: silence, laughter, constant key tones, superfluous audio;

initiating a call record in response to a manual record selection;

discontinuing the call record when a stop command is received;

sending an automated pause alert to one or more parties associated with the telephone conversation;

accessing the telephone conversation in real-time when replay of the recorded telephone conversation is complete;

enabling a manual replay selection, wherein replay repeats one or more recorded selections;

in response to receiving the manual replay selection, replaying the one or more recorded selections;

receiving one or more conditions that automatically invoke replay of the telephone conversation, wherein the conditions include one or more of:

the telephone conversation experiences call degradation;

the telephone service experiences complications;

a distraction is detected;

a displacement of a telephone is detected;

battery loss is detected;

mechanical failure of one or more phones is detected;

ambient noise is detected; and a telephone switches to or from a listening mode;

automatically detecting when to initiate pause;

enabling pause when a command to replay is received; and automatically transmitting an automated announcement when manual or automatic replay is invoked.

\* \* \* \* \*